(12) United States Patent
Sakamoto et al.

(10) Patent No.: US 12,194,661 B2
(45) Date of Patent: Jan. 14, 2025

(54) RAPID-INDUCTION SINTER FORGE FOR ROLL-TO-ROLL CONTINUOUS MANUFACTURING OF THIN FILMS

(71) Applicant: THE REGENTS OF THE UNIVERSITY OF MICHIGAN, Ann Arbor, MI (US)

(72) Inventors: Jeffrey Sakamoto, Ann Arbor, MI (US); Michael Wang, Ann Arbor, MI (US); Nathan Taylor, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 97 days.

(21) Appl. No.: 17/163,726

(22) Filed: Feb. 1, 2021

(65) Prior Publication Data
US 2021/0346951 A1    Nov. 11, 2021

Related U.S. Application Data

(60) Provisional application No. 62/968,739, filed on Jan. 31, 2020.

(51) Int. Cl.
*B22F 5/00* (2006.01)
*B22F 1/10* (2022.01)
(Continued)

(52) U.S. Cl.
CPC ............... *B29C 43/56* (2013.01); *B22F 1/10* (2022.01); *B22F 3/03* (2013.01); *B22F 3/105* (2013.01);
(Continued)

(58) Field of Classification Search
None
See application file for complete search history.

(56) References Cited

U.S. PATENT DOCUMENTS

| 4,788,842 A | 12/1988 | Kopp et al. |
| 5,273,956 A | 12/1993 | Johnson et al. |
| (Continued) | | |

FOREIGN PATENT DOCUMENTS

| CN | 1233347 | 10/1999 |
| CN | 1479659 | 3/2004 |
| (Continued) | | |

OTHER PUBLICATIONS

Lange et al., Processing-Related Fracture Origins: IV, Elimination of Voids Produced by Organic Inclusions, Journal of the American Ceramic Society, 1986, 69(1):66-69.

(Continued)

*Primary Examiner* — Mohammad M Ameen
(74) *Attorney, Agent, or Firm* — Quarles & Brady LLP

(57) ABSTRACT

A method of and apparatus for sinter forging a precursor powder to form a film may reduce or eliminate the stress in the film and may facilitate processing of continuous length of films such as ceramic films for use in batteries. The precursor powder can be provided on a substrate and is simultaneously heated and pressed in a pressing direction parallel to a thickness of the film so as to sinter and densify the precursor powder to form the film in a sinter forging area. Notably, in a plane perpendicular to the pressing direction, there are no lateral constraints on the sinter forging area or the material received therein.

40 Claims, 3 Drawing Sheets

(51) Int. Cl.
| | |
|---|---|
| *B22F 3/03* | (2006.01) |
| *B22F 3/105* | (2006.01) |
| *B22F 3/14* | (2006.01) |
| *B29C 43/56* | (2006.01) |
| *C04B 35/622* | (2006.01) |
| *C04B 35/645* | (2006.01) |

(52) U.S. Cl.
CPC .............. *B22F 3/14* (2013.01); *B22F 5/006* (2013.01); *C04B 35/62218* (2013.01); *C04B 35/645* (2013.01); *B22F 2003/1053* (2013.01); *B22F 2203/11* (2013.01); *B22F 2301/15* (2013.01); *B22F 2301/35* (2013.01); *B22F 2301/45* (2013.01); *C04B 2235/764* (2013.01)

(56) References Cited

U.S. PATENT DOCUMENTS

| | | | |
|---|---|---|---|
| 2005/0026040 A1* | 2/2005 | Thackeray ............ | H01M 4/485 |
| | | | 429/223 |
| 2014/0030638 A1 | 10/2014 | Raj et al. | |
| 2015/0099188 A1 | 4/2015 | Holme | |
| 2015/0136209 A1* | 5/2015 | Hattori ............... | C08G 73/1067 |
| | | | 205/196 |
| 2017/0022112 A1 | 1/2017 | Karpenko et al. | |
| 2017/0179522 A1* | 6/2017 | Choi ................. | H01M 10/0525 |
| 2017/0222254 A1 | 8/2017 | Sakamoto et al. | |
| 2017/0297100 A1* | 10/2017 | Gibson ................ | B33Y 50/02 |
| 2018/0037514 A1 | 12/2018 | Beck et al. | |

FOREIGN PATENT DOCUMENTS

| | | | |
|---|---|---|---|
| CN | 101678458 | | 3/2010 |
| CN | 105609225 | | 5/2016 |
| CN | 105870497 A | * | 8/2016 |
| CN | 205482320 U | | 8/2016 |
| CN | 207585354 U | * | 7/2018 |
| CN | 110459395 | | 11/2019 |
| JP | 2002308675 | | 10/2002 |
| JP | 2002308675 A | * | 10/2002 |

OTHER PUBLICATIONS

Quach et al., Chapter 10—Fundamentals and Applications of Field/Current Assisted Sintering, in Sintering of Advanced Materials, 2010, Woodhead Publishing Limited, pp. 249-275.

Raj et al., Influence of Externally Imposed and Internally Generated Electrical Fields on Grain Growth, Diffusional Creep, Sintering and Related Phenomena in Ceramics, Journal of the American Ceramic Society, 2011, 94(7):1941-1965.

Rangasamy et al., The Role of Al and Li Concentration on the Formation of Cubic Garnet Solid Electrolyte of Nominal Composition Li7La3Zr2O12, Solid State Ionics, 2012, 206:28-32.

Siemiaszko et al., The Effect of Oxygen Partial Pressure on Microstructure and Properties of Fe40Al Alloy Sintered Under Vacuum, Materials, 2015, 8(4):1513-1525.

Skandan et al., The Effect of Applied Stress on Densification of Nanostructured Zirconia During Sinter-Forging, Materials Letters, 1994, 20:305-309.

Venkatachari et al., Shear Deformation and Densification of Powder Compacts, Journal of the American Ceramic Society, 1986, 69(6):499-506.

Venkatachari et al., Enhancement of Strength Through Sinter Forging, Journal of the American Ceramic Society, 1987, 70(7):514-520.

PCT International Search Report and Written Opinion, PCT/US2021/016012, Aug. 13, 2021, 14 pages.

Machine Translation of CN205482320U.
Machine Translation of CN105870497A.
Machine Translation of JP2002308675A.
Machine Translation of CN101678458A.
Machine Translation of CN105609225A.
Machine Translation of CN110459395A.
Machine Translation of CN1233347A.
Machine Translation of CN1479659A.

* cited by examiner

RAPID-INDUCTION SINTER FORGE FOR ROLL-TO-ROLL CONTINUOUS MANUFACTURING OF THIN FILMS

CROSS-REFERENCES TO RELATED APPLICATIONS

This application is based on and claims priority to U.S. Patent Application No. 62/968,739 filed Jan. 31, 2020, which is hereby incorporated by reference herein in its entirety for all purposes.

STATEMENT REGARDING FEDERALLY SPONSORED RESEARCH

This invention was made with government support under DE-AR0000653 awarded by the Department of Energy. The government has certain rights in the invention.

BACKGROUND OF THE INVENTION

1. Field of the Invention

The present disclosure relates to an apparatus for and methods of formation of thin films via rapid-induction sinter forging.

2. Description of the Related Art

The densification of loosely bound powders into dense compacts at elevated temperatures is a common and widespread method of manufacturing materials and components. Conventionally, so-called green bodies or compacts that are initially a loosely bound collection of powder particles are sintered together at high temperatures that approach, but does not exceed, the melting temperature of the particles being sintered together to cause the particles to diffuse and neck into one another thereby forming a unitary sintered body. Typically, sintering employs solid-state diffusion alone, meaning that the powder material being sintered does not melt at all during sintering; however, in limited circumstances and for certain powder chemistries and morphologies, there may be a small amount of liquid phase generated during the sintering process. During sintering, as the various particles are diffusively joined together, pores are initially created between the particles as they neck together. As sintering continues, the amount of porosity decreases resulting in some amount of accompanying volumetric reduction. This also results in an increase in density relative to the starting un-sintered green body or compact.

Because the defects in the sintered material play an important role in the properties and performance, methods for eliminating processing defects are of great importance for optimization of manufacturing [Refs. 1, 2] including in sintered articles. While free-sintering involves the sole use of elevated temperatures to densify a powder compact, there exist other assistive techniques such as hot-pressing (HP) and hot isostatic pressing (HIP) that use a combination of elevated temperatures and pressures to enhance densification transport mechanisms and eliminate defects caused by inhomogeneous powder packing [Refs. 1-4]. Both HP and HIP require the green body to be contained in a die for HP and a pressurized fluid for HIP. Another technique, sinter forging, also involves the application of elevated temperature and pressure in the uniaxial direction [Refs. 5, 6].

What is needed is a way to further eliminate defects in as-sintered articles.

SUMMARY OF THE INVENTION

To further eliminate defects in as-sintered articles—especially thin films—it is disclosed herein that, in the right configuration, sinter forging without lateral constraints may be employed. Such sinter forging without lateral constraints may be significantly more amenable to continuous manufacturing processes of the production of thin films. Herein, a design is proposed of a system for scalable sinter forging of dense thin films of material with precise control over the processing conditions (e.g., temperature, pressure, gas environment).

As noted above, the microstructural defects formed during the compaction of powder into sintered compacts are often caused by inhomogeneities in the powder packing, resulting in non-uniform sintering. Although techniques like hot-pressing or hot-isostatic pressing can aid in eliminating these defects, the need to contain the powder leads to the possibility of residual shear stress in the sintered material and also makes it difficult to achieve scalable, high throughput manufacturing. Unlike hot-pressing or hot-isostatic pressing, a method of densifying materials according to this disclosure uses a combination of temperature and pressure without any lateral constraints. Because of the lack of lateral constraints from a die or containment vessel, shear deformation is allowed to occur during sintering, thereby eliminating any residual shear stress. The use of sinter forging as disclosed herein allows for the possibility of continuous manufacturing, using similar methods as roll-to-roll processing. The present disclosure presents a design for a sinter forging apparatus and sinter forging methods that may operate using rapid-induction heating and that may allow for continuous manufacturing of dense, thin films of materials.

According to one aspect, a method of sinter forging a precursor powder to form a film is provided. The precursor powder is provided on a substrate. The precursor powder is simultaneously heated and pressed in a pressing direction parallel to a thickness of the film so as to sinter and densify the precursor powder to form the film in a sinter forging area. In a plane perpendicular to the pressing direction, there are no lateral constraints on the sinter forging area.

In some embodiments, the lack of lateral constraints on the sinter forging area permits deformation and pressure-aided sintering in the precursor powder during forming the film, inhibiting the formation of residual shear stress in the film. In some embodiments, the simultaneous application of heat and pressure produces deformation and pressure-aided sintering in the precursor powder to produce a dense ceramic body.

In some embodiments, frictional stress between the film and the substrate produces a hydrostatic stress state in the film during sintering. In some embodiments, a combination of stress of applied pressure and frictional pressure produces a hydrostatic stress state in the film during sintering. Adhesion is good enough to mechanically support the film but weak enough to de-bond if it is desired to in-situ form a metal anode between the substrate (e.g., a current collector) and the film (e.g., a ceramic electrolyte).

In some embodiments, when the precursor powder is not being simultaneously heated and pressed (and any pressing element such as a piston is lifted), the substrate may be movable in a direction generally along the plane perpendicular to the pressing direction. With the substrate and powder being movable, the method may further comprise iteratively performing the steps of (a) simultaneously heating and pressing the precursor powder to form the film, (b) removing pressure from the film, and (c) advancing the precursor powder and the substrate to introduce yet-unsintered precursor powder into the sinter forging area. In this way, a continuous length of the substrate having a length exceeding a maximum dimension of the sinter forging area may have one or more films formed thereon by cyclic sinter forging.

In some embodiments, the step of simultaneously heating and pressing the precursor powder may be performed by a piston that is part of an apparatus and this apparatus may articulate the piston into and out of the sinter forging area. In this case, the method may further comprise the step of heating the piston using induction heating by use of induction coils that surround the piston. In such form, it is contemplated that the piston may comprise graphite or another material which is both structurally able to provide a pressing force and is heatable by induction heating (that is, is receptive to induction heating). In some embodiments, prior to the step of simultaneously heating and pressing the precursor powder, a release layer may be applied to prevent adhesion of the piston and the film. Such a release layer could be for example, a nickel foil.

In some embodiments, the method may further comprise the step of heating the substrate using induction heating by use of induction coils that surround the substrate.

In some embodiments, the method may further comprise the step of providing an environmental gas around the sinter forging area.

In some embodiments, the precursor powder may be part of a powder slurry or the precursor powder may be a dry powder. It is contemplated that the precursor powder could be metal or a ceramic. The precursor powder used in the examples below is a ceramic powder that may be used to form thin ceramic films for battery production. The precursor powder may include a binder selected from the group consisting of polyvinylidene fluoride, poly(methylmethacrylate), poly(vinylacetate), polyvinyl alcohol, polyethyleneoxide, polyvinylpyrrolidone, polyvinyl ether, polytetrafluoroethylene, polyacrylate, polyvinylchloride, polyacrylonitrile, polyvinylpyridine, styrene-butadiene rubber, acrylonitrile-butadiene rubber, polyethylene, polypropylene, ethylene-propylene-diene terpolymers, cellulose, carboxymethylcellulose, starch, hydroxypropylcellulose, and mixtures thereof.

In some embodiments of the method, the sintered film comprises a solid electrolyte material that can be any combination oxide or phosphate materials with the garnet, perovskite, NaSICON, or LiSICON phase.

In some embodiments of the method, the sintered film comprises a solid electrolyte material comprising a ceramic material having a formula of $Li_wA_xM_2Re_{3-y}O_z$, wherein w is 5-7.5,
wherein A is selected from B, Al, Ga, In, Zn, Cd, Y, Sc, Mg, Ca, Sr, Ba, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75,
wherein z is 10.875-13.125, and
wherein the ceramic material has a garnet-type or garnet-like crystal structure.

In some embodiments of the method, the sintered film comprises a sulfide-based solid electrolyte material including at least lithium, sulfur, and phosphorous. The sulfide-based solid electrolyte material can be selected from the group consisting of $Li_7P_3S_{11}$, $Li_7PS_6$, $Li_4P_2S_6$, $Li_3PS_6$, $Li_3PS_4$, $Li_2P_2S_6$, $Li_{10}GeP_2S_{12}$ (LGPS), and argyrodite-type solid electrolyte materials selected from $Li_{7-x}PS_{6-x}Cl_x$, $Li_{7-x}PS_{6-x}Br_x$, and $Li_{7-x}PS_{6-x}I_x$, wherein $0 \leq x \leq 2$.

In some embodiments of the method, the sintered film comprises a lithium host material. The lithium host material can be selected from the group consisting of (i) lithium metal oxides wherein the metal is one or more aluminum, cobalt, iron, manganese, nickel and vanadium, and (ii) lithium-containing phosphates having a general formula $LiMPO_4$ wherein M is one or more of cobalt, iron, manganese, and nickel.

In some embodiments of the method, the step of simultaneously heating and pressing the precursor powder comprises heating at a temperature between 30° C. to 2000° C. and pressing between 1 MPa to 500 MPa. In some embodiments, the step of simultaneously heating and pressing the precursor powder comprises heating at a temperature between 500° C. to 1300° C. and pressing between 1 MPa to 50 MPa. Of course, such temperatures are exemplary and it is contemplated the temperatures and pressure ranges to be achieved can be a function of the precursor powder to be formed into a film and temperature, pressure, and time may be altered variables to create a sintered film of a desired density and microstructure.

In some embodiments of the method, the sintered film has greater than 90% relative density with less than 90 minutes of sinter forging time. In some embodiments, the sintered films have greater than 98% relative density with less than 5 minutes of sinter forging time.

In some embodiments of the method, the sintered film has a thickness between 1 nanometer and 500 micrometers. In some embodiments, the sintered film has a thickness between 1 nanometer and 100 micrometers. In some embodiments of the method, the substrate has a thickness between 1 nanometer and 100 micrometers.

In some embodiments of the method, the substrate comprises a metallic material selected from the group consisting of nickel, molybdenum, titanium, zirconium, tantalum, alloy steel, carbon steel, stainless steel, nickel based super alloys, cobalt based super alloys, copper, aluminum, iron, or mixtures thereof. In some embodiments of the method, the substrate comprises a bimetal having a first layer comprising a first metallic material and a second layer comprising a second metallic material. The first metallic material can be selected from the group consisting of nickel, molybdenum, titanium, zirconium, tantalum, nickel based super alloys, cobalt based super alloys, copper, or mixtures thereof, and the second material can be selected from the group consisting of aluminum, nickel, alloy steel, carbon steel, stainless steel, nickel based super alloys, or mixtures thereof. In some embodiments of the method, the first metallic material comprises nickel, and the second material comprises stainless steel. In some embodiments, the first layer has a thickness between 1 nanometer and 100 micrometers, and the second layer has a thickness between 1 nanometer and 100 micrometers.

In some embodiments of the method, a graphite particle layer is positioned between the substrate and the precursor powder. In some embodiments, the graphite particle layer has a thickness between 1 μm and 10 μm.

According to another aspect, an apparatus for sinter forging a precursor powder on a substrate to form a film is provided. The apparatus includes a load frame, a piston, and a set of induction coils. The load frame has a sinter forging area defined therein for reception of the precursor powder. The piston is receptive to induction heating and is actuatable in a pressing direction by the load frame to simultaneously apply heat and pressure to a precursor powder received in the sinter forging area. The set of induction coils are concentric with the piston such that the piston is heatable by radio frequency induction. The sinter forging area lies along a plane perpendicular to the pressing direction and there are no lateral constraints on the sinter forging area.

In some embodiments, a lack of lateral constraints on the sinter forging area permits deformation and pressure-aided sintering in the precursor powder during forming the film, inhibiting the formation of residual shear stress in the film. In some embodiments, the simultaneous application of heat and pressure produces deformation and pressure-aided sintering in the precursor powder to produce a dense ceramic body. In some embodiments, frictional stress between the film and the substrate produces a hydrostatic stress state in the film during sintering. In some embodiments, a combination of stress of applied pressure and frictional pressure produces a hydrostatic stress state in the film during sintering.

In some embodiments, the apparatus may further include a non-conductive shroud surrounding the piston that defines a hollow cavity in between the piston and the non-conductive shroud and the hollow cavity can open into the sinter forging area. A gas inlet in fluid communication with the hollow cavity may be configured to provide gases into the hollow cavity that flow therefrom, through the hollow cavity over the piston, and into a surrounding environment in the sinter forging area.

In some embodiments, the apparatus may further include a transport mechanism for advancing the precursor powder and the substrate through the sinter forging area. This can be used to facilitate production of a continuous length of film suitable for cutting to a desired length.

In some embodiments, the apparatus may further include a system for controlling the temperature of the substrate comprising of one or more of thermocouples, a temperature controller, and coolant circulation.

In some embodiments, the piston may comprise graphite. However, regardless of the material, it is contemplated that the piston may be capable of being heated to a temperature between 500° C. to 1300° C. by the set of induction coils and of applying a pressure between 1 MPa to 50 MPa by the load frame in the sinter forging area. In some embodiments, the piston is capable of being heated to a temperature between 30° C. to 2000° C. by the set of induction coils and of applying a pressure between 1 MPa to 500 MPa by the load frame in the sinter forging area.

According to another aspect, a method for forming an electrochemical device comprising an array of spaced apart sintered films is provided. The method can include the steps of: supporting spaced apart portions of a precursor powder on a substrate; simultaneously heating and pressing the spaced apart portions of the precursor powder in a pressing direction parallel to a thickness of the spaced apart portions of the precursor powder so as to create spaced apart sintered films on the substrate; and depositing a flexible material between the spaced apart sintered films on the substrate.

In one embodiment of the method, each spaced apart sintered film is created in a separate sinter forging area, and in a plane perpendicular to the pressing direction, there are no lateral constraints on each sinter forging area. A lack of lateral constraints on each sinter forging area permits deformation and pressure-aided sintering in the precursor powder during forming the sintered films, inhibiting the formation of residual shear stress in each sintered film. In some embodiments, the simultaneous application of heat and pressure produces deformation and pressure-aided sintering in the precursor powder to produce a dense ceramic body. In some embodiments, frictional stress between the films and the substrate produces a hydrostatic stress state in the films during sintering. In some embodiments, a combination of stress of applied pressure and frictional pressure produces a hydrostatic stress state in the films during sintering. Adhesion is good enough to mechanically support the film but weak enough to de-bond if it is desired to in-situ form a metal anode between the substrate (e.g., a current collector) and the film (e.g., a ceramic electrolyte).

In one embodiment of the method, when the spaced apart portions of the precursor powder are not being simultaneously heated and pressed, the substrate is movable in a direction generally along the plane perpendicular to the pressing direction.

One embodiment of the method further comprises iteratively performing the steps of: (a) simultaneously heating and pressing the spaced apart portions of the precursor powder to form the spaced apart sintered films; (b) removing pressure from the spaced apart sintered films; (c) advancing the substrate to introduce yet-unsintered spaced apart portions of the precursor powder into the sinter forging areas; and (d) depositing a flexible material between the spaced apart sintered films on the substrate, whereby a continuous length of an array of spaced apart sintered films surrounded by the flexible material is formed by cyclic sinter forging.

In the method, the spaced apart sintered films can comprise a solid electrolyte material that can be any combination oxide or phosphate materials with the garnet, perovskite, NaSICON, or LiSICON phase. The spaced apart sintered films can comprise a solid electrolyte material comprising a ceramic material having a formula of $Li_wA_xM_2Re_{3-y}O_z$,
wherein w is 5-7.5,
wherein A is selected from B, Al, Ga, In, Zn, Cd, Y, Sc, Mg, Ca, Sr, Ba, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75,
wherein z is 10.875-13.125, and
wherein the ceramic material has a garnet-type or garnet-like crystal structure.

In the method, the spaced apart sintered films can comprise a sulfide-based solid electrolyte material including at least lithium, sulfur, and phosphorous. The sulfide-based solid electrolyte material can be selected from the group consisting of $Li_7P_3S_{11}$, $Li_7PS_6$, $Li_4P_2S_6$, $Li_3PS_6$, $Li_3PS_4$, $Li_2P_2S_6$, $Li_{10}GeP_2S_{12}$ (LGPS), and argyrodite-type solid electrolyte materials selected from $Li_{7-x}PS_{6-x}Cl_x$, $Li_{7-x}PS_{6-x}Br_x$, and $Li_{7-x}PS_{6-x}I_x$, wherein $0 \leq x \leq 2$.

In the method, the spaced apart sintered films can comprise a lithium host material. The spaced apart sintered films can comprise a lithium host material selected from the group consisting of (i) lithium metal oxides wherein the metal is one or more aluminum, cobalt, iron, manganese, nickel and vanadium, and (ii) lithium-containing phosphates having a general formula $LiMPO_4$ wherein M is one or more of cobalt, iron, manganese, and nickel.

In the method, the flexible material can comprise a polymeric material selected from the group consisting of polyolefins, polystyrene, divinylbenzene, ethylene vinyl acetate polymers and co-polymers, silicone polymers, and styrene-divinylbenzene copolymer, and blends and mixtures thereof.

In some embodiments of the method, the precursor powder includes a binder. The binder can be selected from the group consisting of polyvinylidene fluoride, poly(methylmethacrylate), poly(vinylacetate), polyvinyl alcohol, polyethyleneoxide, polyvinylpyrrolidone, polyvinyl ether, polytetrafluoroethylene, polyacrylate, polyvinylchloride, polyacrylonitrile, polyvinylpyridine, styrene-butadiene rubber, acrylonitrile-butadiene rubber, polyethylene, polypropylene, ethylene-propylene-diene terpolymers, cellulose, carboxymethylcellulose, starch, hydroxypropylcellulose, and mixtures thereof.

In some embodiments of the method, the spaced apart sintered films have a thickness between 1 nanometer and 500 micrometers. In some embodiments of the method, the spaced apart sintered films have a thickness between 1 nanometer and 100 micrometers. In some embodiments of the method, the substrate has a thickness between 1 nanometer and 100 micrometers.

In some embodiments of the method, the substrate comprises a metallic material selected from the group consisting of nickel, molybdenum, titanium, zirconium, tantalum, alloy steel, carbon steel, stainless steel, nickel based super alloys, cobalt based super alloys, copper, aluminum, iron, or mixtures thereof.

In some embodiments of the method, the substrate comprises a bimetal having a first layer comprising a first metallic material and a second layer comprising a second metallic material. The first metallic material can be selected from the group consisting of nickel, molybdenum, titanium, zirconium, tantalum, nickel based super alloys, cobalt based super alloys, copper, or mixtures thereof, and the second material is selected from the group consisting of aluminum, nickel, alloy steel, carbon steel, stainless steel, nickel based super alloys, or mixtures thereof. In some embodiments of the method, the first metallic material comprises nickel, and the second material comprises stainless steel. In some embodiments of the method, the first layer has a thickness between 1 nanometer and 100 micrometers, and the second layer has a thickness between 1 nanometer and 100 micrometers.

In some embodiments of the method, a graphite particle layer is positioned between the substrate and the precursor powder. The graphite particle layer can have a thickness between 1 μm and 10 μm.

These and other features, aspects, and advantages of the present disclosure will become better understood upon consideration of the following detailed description, drawings, and appended claims.

DETAILED DESCRIPTION OF THE INVENTION

Figure 1A:
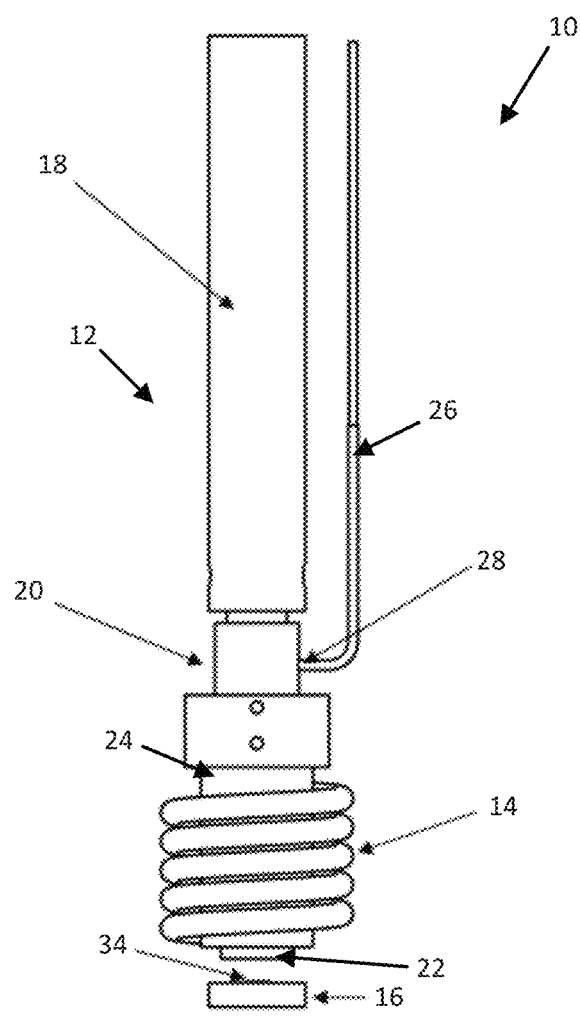
FIGS. 1a and 1b are exemplary schematics of a sintering forging apparatus in a front side view and a cross-sectional side view, respectively, according to one embodiment of the present disclosure.

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

As used herein, a "green body" or "compact" refers to a loosely bound collection of powder particles that may be either metal, ceramic, or both. "Sintering" refers to a high temperature process to reduce porosity in a material, typically a green body or compact, and produce a dense compact.

As used herein, "roll-to-roll" refers to a type of continuous manufacturing process in which materials, structures, or devices are printed, coated, or patterned onto or embedded into a roll of flexible substrate. Such roll-to-roll processes are described, for example, in U.S. Patent Application Publication No. 2017/0222254 published on Aug. 3, 2017 to Sakamoto et al., and which is incorporated by reference herein in its entirety for all purposes.

As used herein, "rapid-induction heating" refers to a method of using electromagnetic induction to transmit energy and heat a receiver material at high heating rates.

The disclosed apparatus and related method can utilize a combination of a load frame and rapid-induction heating to enable high throughput sinter forging of thin films which is compatible with roll-to-roll manufacturing. Generally speaking, the disclosed apparatus and method can be targeted toward the sintering of areas of powder cast onto rolls of metal foil. After the powder is cast onto the metal substrate, the powder is brought below a pressing piston in which the piston is rapidly heated using electromagnetic induction. The piston, which is connected to a load frame, is brought into contact with the cast powder/green film and the load frame is used to apply uniaxial compression. Meanwhile, an environmental gas can flow from an inlet, enveloping the piston and powder. After pressing for a given length of time, the powder is compacted into a dense, sintered film and the piston is raised. At this point, the sintered film can be transported away, and a new green film (or a new section of the green film) can be brought in for sinter forging. This system and these methods have been used to demonstrate thin 70 μm ceramic films with >98% relative densities with <5 minutes of sinter forging time. However, it is contemplated that thin films of up to 1 mm thickness could be produced using these methods. In one embodiment of the method, the thickness of the sintered thin films is between 1 nanometer and 100 micrometers. For the sake of clarity, thickness is to be understood as the dimension of the film that is parallel with the direction of pressing of the punch and that is perpendicular to the surface contacting the upper surface of the thin film.

System Design

Figure 1B:
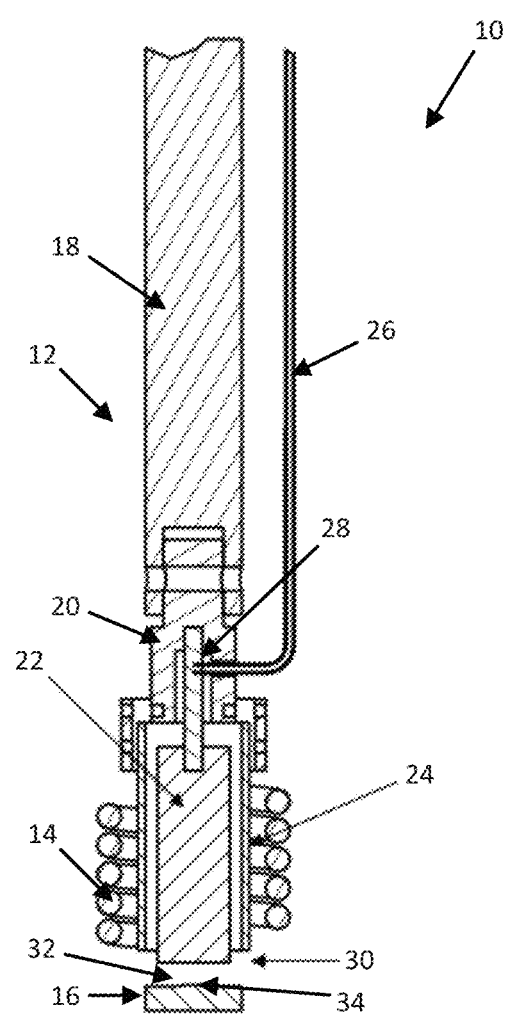

The proposed sinter forging system and apparatus is depicted in FIGS. 1a and 1b. The proposed apparatus 10 is composed of three main components: the load frame 12, the induction heater including the induction coils 14, and the sample substrate 16 that supports a sample 34. Prior to sinter forging, the sample 34 can be a green powder either in the form of a cast powder slurry or a dry powder for example and, after sinter forging, the sample 34 will be in the form of a sintered thin film.

The system can utilize a commercial load frame for measuring and controlling the applied pressure. As illustrated in FIGS. 1a and 1b, the load frame 12 includes the crosshead 18 and an intermediate mount 20 that is connected to a piston 22 to transmit the force from the crosshead 18 to the piston 22. The load frame 12, which is not shown in full in the figures, could be any load frame and such load frames are well known within the art. For example, the load frame could be a load frame such as those commonly manufactured by Instron® of Norwood, Massachusetts, USA and TA® Instruments of New Castle, Delaware, USA. However, the particular load frame employed could be a hydraulic or electrohydraulic press instead of a smaller electromechanical load frame so as to better facilitate continuous production and to account for the desired scale of production. The piston 22 may be formed of a material that is receptive to heating by induction, such as a graphite material and which also provides sufficient mechanical strength to apply the forging pressures.

Beyond providing a mechanical connection between the crosshead 18 and the piston 22, the intermediate mount 20 may also be used to support a shroud 24. The shroud 24 may be a non-conductive material, such as quartz, and shield the piston 22 from the induction coils 14 while also containing an environmental gas. Said environmental gas may be provided by a gas supply 26 (primarily shown as the supplying gas conduit in FIGS. 1a and 1b) that has an gas inlet 28 in fluid communication with the volume between the piston 22, the intermediate mount 20, and the shroud 24. As depicted, the gas inlet 28 is in the intermediate mount such that the gas flowing from the inlet 28 flows through the volume between the shroud 24 and piston 22 and out a gas outlet 30 in the vicinity of the sinter forging area 32 where the material is heated and pressed.

For temperature control, a commercial induction heater and temperature controller may be used. As the piston 22 enters the area within the induction coils 14, the piston 22 can be heated by electromagnetic induction. The sample temperature is measured by a thermocouple in the substrate 16 and controlled by the temperature controller, which modulates the power output of the coils 14. Alternatively, the substrate can be heated using induction heating by use of induction coils that surround the substrate.

Finally, the sample substrate 16 acts as a support for the sample 34 during sinter forging and can be integrated into roll-to-roll processes, where a continuous roll of metal substrate moves beneath the sinter forging piston 22.

Materials Processing

In one example process using the apparatus 10, the garnet structured lithium lanthanum zirconium oxide (LLZO) with the composition $Li_{6.5}La_3Zr_{1.5}Ta_{0.5}O_{12}$ was used as an example ceramic precursor powder for densification. LLZO powders were synthesized by a solid-state synthesis, as described by Rangasamy [Ref. 7] and then mixed into a slurry containing solvent, dissolved polymeric binder, and plasticizer. The slurry was then cast onto 35 μm thick Ni foil (Targray) using a doctor blade. After drying, the resulting green film was placed on a graphite substrate and covered with another Ni foil with a 200 nm layer of sputtered C, which acted as a release layer, preventing adhesion between the sample and the sinter forge piston. The green film was then sinter forged in Ar at a pressure of 6 MPa at varying temperatures with a ramp rate of ~3° C. s$^{-1}$. The peak temperature (noted elsewhere in this disclosure as being 1150° C. or 1250° C. depending on the sample) was held for varying amounts of time between 2 minutes and 30 minutes before removal of the piston and cooling. After densification, the films were cut on a diamond saw and polished to a 1 μm surface finish. Cross sectional analysis was then conducted using a Hitachi S3500N scanning electron microscope.

While exemplary temperatures, times, and pressure are provided above, it is contemplated that, depending upon the material, the precursor powder may be heated at a temperature between 500° C. to 1300° C. and pressed between 1 MPa to 50 MPa.

Cross-Sectional Analysis

Figure 2:
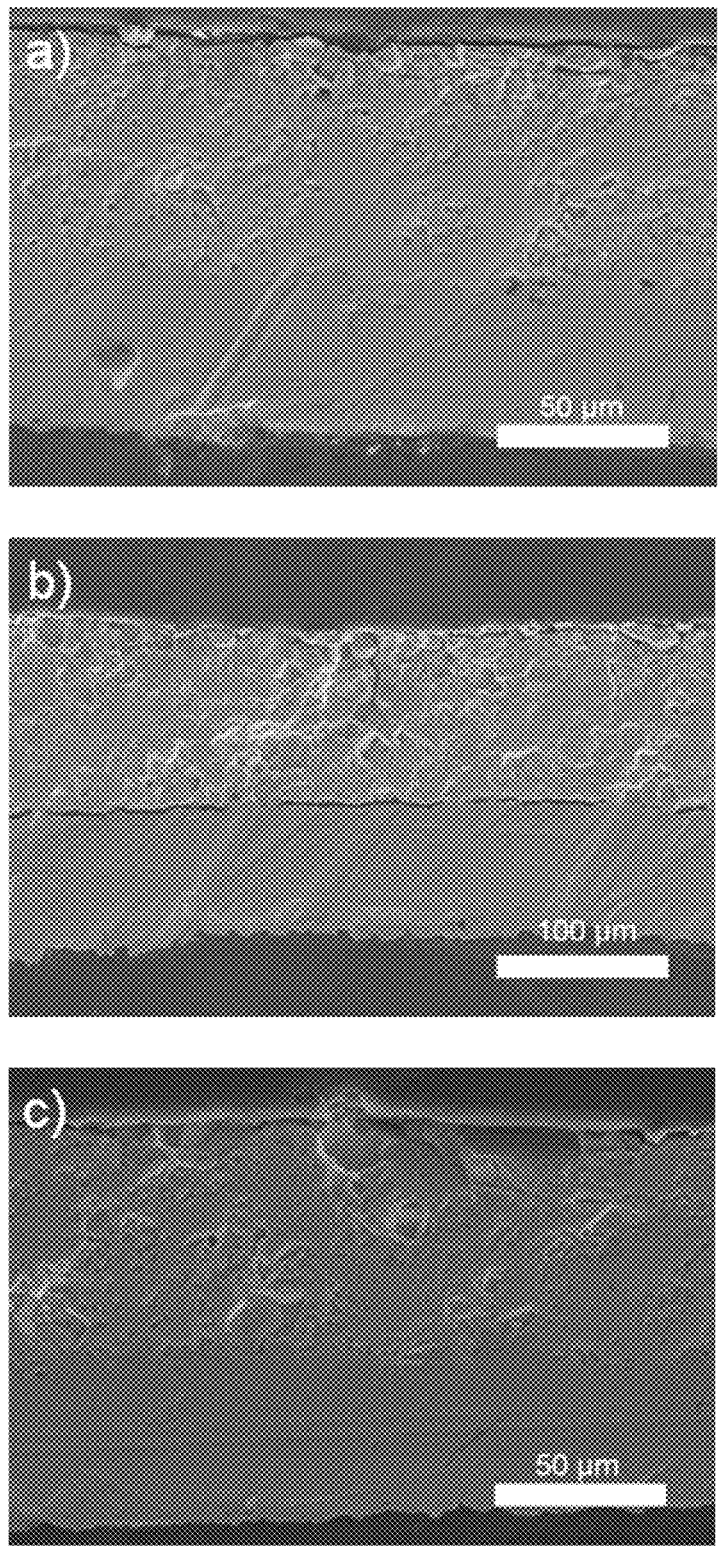
FIG. 2 is a cross-sectional image taken with a scanning electron microscope (SEM) of LLZO films sinter-forged at image (a) 1150° C. for 20 minutes, image (b) 1250° C. for 5 minutes, and image (c) 1250° C. for 2 minutes according to various embodiments of the present disclosure.

FIG. 2 shows in images a), b), and c), the cross sections for three LLZO films densified onto Ni foil at different temperatures and sinter forging times. In all three samples, it can be seen that LLZO films with a relatively uniform thickness of ~80 μm were fabricated with intimate LLZO/Ni contact. While the sample densified at 1150° C. for 20 minutes from FIG. 2 image a) shows the most uniformity in the cross-section as compared to the samples densified at 1250° C. for 5 minutes from FIG. 2 image b) and 1250° C. for 2 minutes from FIG. 2 image c), the samples produced at all three conditions exhibit low degrees of porosity (<2%). Even in the case of the smallest sinter forging time (2 minutes), low amounts of porosity are observed, suggesting that the application of pressure and the lack of lateral constraints allows for very rapid closure of pores. Although the densities of the films are relatively similar, the microstructure is significantly more uniform in the case of 20 minute sinter forging from FIG. 2 image a), while the microstructures for <5 minutes (i.e., FIG. 2 image b) and image c)) sinter forging exhibit areas of intergranular fracture. These areas are likely due to fracture and removal of individual grains during cross-sectioning. This suggests that even though the density does not significantly change with time, longer sinter forging time promotes stronger grain-grain adhesion. Therefore, these parameters might be optimized for the best combination of microstructure and manufacturing time.

Continuous Processing

Beyond the example provided above, it is contemplated that the apparatus 10 may be used in roll-to-roll processes which are continuous manufacturing processes in which materials, structures, or devices are printed, coated, or patterned onto or embedded into a roll of flexible substrate as described in aforementioned U.S. Patent Application Publication No. 2017/0222254. It should be noted that such application describes a segmented cellular structure in which ceramic thin film segments are positioned within a flexible matrix such as a polymeric material. In such case, each of the structures might be considered separate thin films that collectively form a sheet. It is also noted that all of the segmented sections are relatively flat coin-like or chip-like segments in which the thickness dimension of the segments is less than the other dimensions of the segment such as width and length (see e.g., FIG. 1a). This structure can facilitate good flexibility of the resultant sheet while, at such aspect ratios of the segments, ensure that the heat transfer through the powder layer during sintering is relatively consistent and with minimal gradient over the thickness of the thin films.

Accordingly, it is also contemplated that the apparatus 10 may be outfitted with a transport mechanism or advancement device for advancing the precursor powder and substrate relative to the sinter forging area when a pressing and heating operation is not in progress. This advancement can include moving the substrate in a direction generally along the plane perpendicular to the pressing direction, although this need not be exactly along the plane, as the substrate, precursor powder, and/or sintered thin film may have some amount of flexure outside this area.

To create a continuous length of the thin film from the precursor powder, the method may include iteratively performing the steps of simultaneously heating and pressing the precursor powder to form the film, removing pressure from the film, and advancing the precursor powder and the substrate to introduce yet-unsintered precursor powder into the sinter forging area. It is contemplated that such advancement may be less than the full length of the sinter forging area, meaning that a segment of the length that has been previously pressed and heated in a first cycle may be pressed and heated again in a second cycle, rather than advancing the substrate and powder/film one full length of the sinter forging area. Among other things, this may aid to reduce the amount of sintered variance over the length of the resulting film and avoid the possibility of under-sintered areas over the length. In this way, a continuous length of the substrate having a length exceeding a maximum dimension of the sinter forging area and having one or more films formed thereon can be created by a cyclic sinter forging action.

In one embodiment, a continuous length of the substrate having a plurality of spaced apart sintered films formed thereon can be created by a cyclic sinter forging action. The space between each of the plurality of spaced apart sintered films on the substrate can then be filled by depositing a flexible material between the spaced apart sintered films. The flexible material can comprise a polymeric material selected from the group consisting of polyolefins, polystyrene, divinylbenzene, ethylene vinyl acetate polymers and co-polymers, silicone polymers, and styrene-divinylbenzene copolymer, and blends and mixtures thereof. The flexible material may comprise polypropylene or polyethylene.

The spaced apart sintered films may each comprise a solid electrolyte material that can be any combination oxide or phosphate materials with the garnet, perovskite, NaSICON, or LiSICON phase. The spaced apart sintered films may each comprise a solid electrolyte material comprising a ceramic material having a formula of $Li_wA_xM_2Re_{3-y}O_z$,
wherein w is 5-7.5,
wherein A is selected from B, Al, Ga, In, Zn, Cd, Y, Sc, Mg, Ca, Sr, Ba, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75,
wherein z is 10.875-13.125, and
wherein the ceramic material has a garnet-type or garnet-like crystal structure.

In one embodiment of the ceramic material, M is a combination of Zr and Ta. In one embodiment of the ceramic material, wherein M is Zr, and A is Al, and x is not 0. In one embodiment of the ceramic material, M is Zr, and A is Ga, and x is not 0.

The spaced apart sintered films may each comprise a sulfide-based solid electrolyte material including at least lithium, sulfur, and phosphorous. The sulfide-based solid electrolyte material can be selected from the group consisting of $Li_7P_3S_{11}$, $Li_7PS_6$, $Li_4P_2S_6$, $Li_3PS_6$, $Li_3PS_4$, $Li_2P_2S_6$, $Li_{10}GeP_2S_{12}$ (LGPS), and argyrodite-type solid electrolyte materials selected from $Li_{7-x}PS_{6-x}Cl_x$, $Li_{7-x}PS_{6-x}Br_x$, and $Li_{7-x}PS_{6-x}I_x$, wherein $0 \leq x \leq 2$.

The spaced apart sintered films may each comprise a lithium host material selected from the group consisting of (i) lithium metal oxides wherein the metal is one or more aluminum, cobalt, iron, manganese, nickel and vanadium, and (ii) lithium-containing phosphates having a general formula $LiMPO_4$ wherein M is one or more of cobalt, iron, manganese, and nickel. If desired, the substrate can then be removed from the plurality of spaced apart sintered films embedded in the deposited flexible material.

In some embodiments of the method, the precursor powder includes a binder. The binder can be selected from the group consisting of polyvinylidene fluoride, poly(methylmethacrylate), poly(vinylacetate), polyvinyl alcohol, polyethyleneoxide, polyvinylpyrrolidone, polyvinyl ether, polytetrafluoroethylene, polyacrylate, polyvinylchloride, polyacrylonitrile, polyvinylpyridine, styrene-butadiene rubber, acrylonitrile-butadiene rubber, polyethylene, polypropylene, ethylene-propylene-diene terpolymers, cellulose, carboxymethylcellulose, starch, hydroxypropylcellulose, and mixtures thereof.

In some embodiments of the method, the spaced apart sintered films have a thickness between 1 nanometer and 500 micrometers. In some embodiments of the method, the spaced apart sintered films have a thickness between 1 nanometer and 100 micrometers. In some embodiments of the method, the substrate has a thickness between 1 nanometer and 100 micrometers.

In some embodiments of the method, the substrate comprises a metallic material selected from the group consisting of nickel, molybdenum, titanium, zirconium, tantalum, alloy steel, carbon steel, stainless steel, nickel based super alloys, cobalt based super alloys, copper, aluminum, iron, or mixtures thereof.

In some embodiments of the method, the substrate comprises a bimetal having a first layer comprising a first metallic material and a second layer comprising a second metallic material. The first metallic material can be selected from the group consisting of nickel, molybdenum, titanium, zirconium, tantalum, nickel based super alloys, cobalt based super alloys, copper, or mixtures thereof, and the second material is selected from the group consisting of aluminum, nickel, alloy steel, carbon steel, stainless steel, nickel based super alloys, or mixtures thereof. In some embodiments of the method, the first metallic material comprises nickel, and the second material comprises stainless steel. In some embodiments of the method, the first layer has a thickness between 1 nanometer and 100 micrometers, and the second layer has a thickness between 1 nanometer and 100 micrometers.

In some embodiments of the method, a graphite particle layer is positioned between the substrate and the precursor powder. The graphite particle layer can have a thickness between 1 μm and 10 μm.

Figure 3:
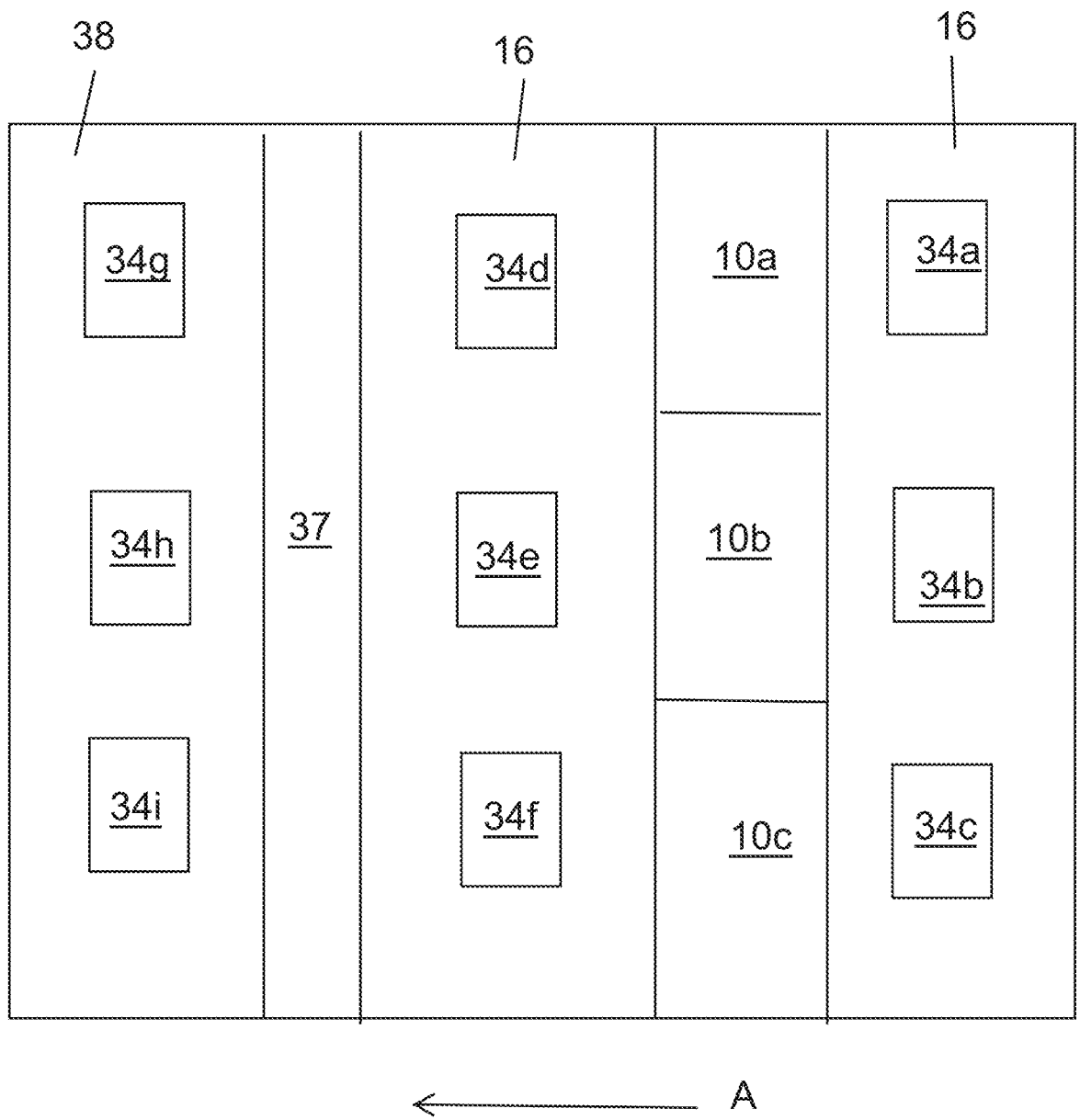
FIG. 3 is a top view of a sintering forging apparatus according to another embodiment of the present disclosure.

Referring to FIG. 3, an array of the plurality of spaced apart sintered films 34g, 34h, 34i embedded in a flexible material 38 can be created by providing a plurality of the apparatus 10 described above (labelled as 10a, 10b, and 10c in FIG. 3) arranged in a line and then advancing in direction A spaced apart samples 34a, 34b, 34c of the precursor powder and the substrate 16 relative to the sinter forging area of each of the apparatus 10a, 10b, and 10c to create a line of spaced apart sintered films 34d, 34e, 34f formed on the substrate 16 by a cyclic sinter forging action wherein the line of spaced apart sintered films 34d, 34e, 34f is transverse to the direction A of advancement of the substrate 16. The space between each of the plurality of spaced apart sintered films 34d, 34e, 34f formed on the substrate 16 can be filled by depositing the flexible material 38 between the spaced apart sintered films 34d, 34e, 34f using a material dispenser 37 to create an array of the plurality of spaced apart sintered films 34g, 34h, 34i embedded in the flexible material 38. The apparatus of FIG. 3 would create an array of three rows and N columns of the spaced apart sintered films as the substrate 16 with the spaced apart sintered films 34d, 34e, 34f is advanced through the material dispenser N times. It can be appreciated that arrays of a different size can be created by selection of the number of the plurality of the apparatus 10 described above and the number of times another column of the spaced apart sintered films 34d, 34e, 34f is advanced through the material dispenser 37 to deposit the flexible material 38.

It is contemplated that such roll-to-roll or continuous length fabrication techniques may be utilized to produce an array of spaced apart sintered films that could be cut to length for the fabrication of batteries.

Thus, in sum, a system and method for sinter forging are proposed for the fabrication of sintered thin films. This system combines rapid-induction heating and roll-to-roll processing to allow for sinter forging at large scale, continuous manufacturing. A demonstration of this design was performed using the LLZO ceramic, which has been slurry cast onto a Ni foil substrate. It was demonstrated that relatively short amounts of time were required to produce dense (>98%) thin (<100 μm) films with intimate ceramic/substrate contact. This system can be used for scalable manufacturing of a wide variety of materials, ranging from structural metals to functional semiconductors.

Although the invention has been described in considerable detail with reference to certain embodiments, one skilled in the art will appreciate that the present invention can be used in alternative embodiments to those described, which have been presented for purposes of illustration and not of limitation. Therefore, the scope of the appended claims should not be limited to the description of the embodiments contained herein.

REFERENCES

[1] Z. Z. Fang, ed., Sintering of Advanced Materials, in: Sinter. Adv. Mater., Woodhead Publishing, 2010: p. iv. doi:10.1016/6978-1-84569-562-0.50019-4.

[2] R. Raj, M. Cologna, J. S. C. Francis, Influence of Externally Imposed and Internally Generated Electrical Fields on Grain Growth, Diffusional Creep, Sintering and Related Phenomena in Ceramics, J. Am. Ceram. Soc. 94 (2011) 1941-1965. doi:10.1111/j.1551-2916.2011.04652.x.

[3] F. F. Lange, B. I. Davis, E. Wright, Processing-Related Fracture Origins: IV, Elimination of Voids Produced by Organic Inclusions, J. Am. Ceram. Soc. 69 (1986) 66-69. doi:10.1111/j.1151-2916.1986.tb04696.x.

[4] G. Skandan, H. Hahn, B. H. Kear, M. Roddy, W. R. Cannon, The effect of applied stress on densification of nanostructured zirconia during sinter-forging, Mater. Lett. 20 (1994) 305-309. doi:10.1016/0167-577X(94)90035-3.

[5] K. R. Venkatachari, R. Raj, Enhancement of Strength through Sinter Forging, J. Am. Ceram. Soc. 70 (1987) 514-520. doi:10.1111/j.1151-2916.1987.tb05686.x.

[6] K. R. Venkatachari, R. Raj, Shear Deformation and Densification of Powder Compacts, J. Am. Ceram. Soc. 69 (1986) 499-506. doi:10.1111/j.1151-2916.1986.tb07452.x.

[7] E. Rangasamy, J. Wolfenstine, J. Sakamoto, The role of Al and Li concentration on the formation of cubic garnet solid electrolyte of nominal composition $Li_7La_3Zr_2O_{12}$, Solid State Ion. 206 (2012) 28-32. doi:10.1016/j.ssi.2011.10.022.

The citation of any document is not to be construed as an admission that it is prior art with respect to the present invention.

What is claimed is:

1. A method of sinter forging a precursor powder to form a film, the method comprising:
   supporting a green yet-unsintered precursor powder on a substrate; and
   simultaneously heating and pressing the green yet-unsintered precursor powder in a pressing direction parallel to a thickness of the film so as to sinter and densify the precursor powder to form the film in a sinter forging area and wherein, in a plane perpendicular to the pressing direction, there are no lateral constraints on the sinter forging area.

2. The method of claim 1, wherein the simultaneous application of heat and pressure produces deformation and pressure-aided sintering in the precursor powder to produce a dense ceramic body.

3. The method of claim 1, wherein frictional stress between the film and the substrate produces a hydrostatic stress state in the film during sintering.

4. The method of claim 1, wherein a combination of stress of applied pressure and frictional pressure produces a hydrostatic stress state in the film during sintering.

5. A method of sinter forging a precursor powder to form a film, the method comprising:
   supporting a precursor powder on a substrate; and
   simultaneously heating and pressing the precursor powder in a pressing direction parallel to a thickness of the film so as to sinter and densify the precursor powder to form the film in a sinter forging area and wherein, in a plane perpendicular to the pressing direction, there are no lateral constraints on the sinter forging area, wherein, when the precursor powder is not being simultaneously heated and pressed, the substrate is movable in a direction generally along the plane perpendicular to the pressing direction.

6. The method of claim 5, wherein the method further comprises iteratively performing the steps of:
   (a) simultaneously heating and pressing the precursor powder to form the film;
   (b) removing pressure from the film; and
   (c) advancing the precursor powder and the substrate to introduce yet-unsintered precursor powder into the sinter forging area;
   whereby a continuous length of the substrate having a length exceeding a maximum dimension of the sinter forging area has one or more films formed thereon by cyclic sinter forging.

7. The method of claim 1, wherein the step of simultaneously heating and pressing the precursor powder is performed by a piston that is part of an apparatus that articulates the piston into and out of the sinter forging area.

8. The method of claim 7, further comprising the step of heating the piston using induction heating by use of induction coils that surround the piston.

9. The method of claim 7, wherein the piston comprises graphite.

10. The method of claim 1, further comprising the step of heating the substrate using induction heating by use of induction coils that surround the substrate.

11. The method of claim 7, further comprising, prior to the step of simultaneously heating and pressing the precursor powder, applying a release layer to prevent adhesion of the piston and the film.

12. The method of claim 1, further comprising the step of providing an environmental gas around the sinter forging area.

13. The method of claim 1, wherein the precursor powder is part of a powder slurry.

14. The method of claim 13 wherein the precursor powder includes a binder.

15. The method of claim 14 wherein the binder is selected from the group consisting of polyvinylidene fluoride, poly(methylmethacrylate), poly(vinylacetate), polyvinyl alcohol, polyethyleneoxide, polyvinylpyrrolidone, polyvinyl ether, polytetrafluoroethylene, polyacrylate, polyvinylchloride, polyacrylonitrile, polyvinylpyridine, styrene-butadiene rubber, acrylonitrile-butadiene rubber, polyethylene, polypropylene, ethylene-propylene-diene terpolymers, cellulose, carboxymethylcellulose, starch, hydroxypropylcellulose, and mixtures thereof.

16. The method of claim 1, wherein the precursor powder is a metal or ceramic material.

17. The method of claim 1 wherein:
the sintered film comprises a solid electrolyte material that can be any combination oxide or phosphate materials with the garnet, perovskite, NaSICON, or LiSICON phase.

18. The method of claim 1 wherein:
the sintered film comprises a solid electrolyte material comprising a ceramic material having a formula of $Li_wA_xM_2Re_{3-y}O_z$,
wherein w is 5-7.5,
wherein A is selected from B, Al, Ga, In, Zn, Cd, Y, Sc, Mg, Ca, Sr, Ba, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75,
wherein z is 10.875-13.125, and
wherein the ceramic material has a garnet-type or garnet-like crystal structure.

19. The method of claim 1 wherein:
the sintered film comprises a sulfide-based solid electrolyte material including at least lithium, sulfur, and phosphorous.

20. The method of claim 19 wherein:
the sulfide-based solid electrolyte material is selected from the group consisting of $Li_7P_3S_{11}$, $Li_7PS_6$, $Li_4P_2S_6$, $Li_3PS_6$, $Li_3PS_4$, $Li_2P_2S_6$, $Li_{10}GeP_2S_{12}$ (LGPS), and argyrodite-type solid electrolyte materials selected from $Li_{7-x}PS_{6-x}Cl_x$, $Li_{7-x}PS_{6-x}Br_x$, and $Li_{7-x}PS_{6-x}I_x$, wherein $0 \leq x \leq 2$.

21. The method of claim 1 wherein:
the sintered film comprises a lithium host material.

22. The method of claim 1 wherein:
the sintered film comprises a lithium host material selected from the group consisting of (i) lithium metal oxides wherein the metal is one or more aluminum, cobalt, iron, manganese, nickel and vanadium, and (ii) lithium-containing phosphates having a general formula $LiMPO_4$ wherein M is one or more of cobalt, iron, manganese, and nickel.

23. The method of claim 1, wherein the step of simultaneously heating and pressing the precursor powder comprises heating at a temperature between 30° C. to 2000° C. and pressing between 1 MPa to 500 MPa.

24. The method of claim 1, wherein the step of simultaneously heating and pressing the precursor powder comprises heating at a temperature between 500° C. to 1300° C. and pressing between 1 MPa to 50 MPa.

25. The method of claim 1, wherein the sintered film has greater than 90% relative density with less than 90 minutes of sinter forging time.

26. The method of claim 1, wherein the sintered film has greater than 98% relative density with less than 5 minutes of sinter forging time.

27. The method of claim 1, wherein the sintered film has a thickness between 1 nanometer and 500 micrometers.

28. The method of claim 1, wherein the sintered film has a thickness between 1 nanometer and 100 micrometers.

29. The method of claim 1, wherein the substrate has a thickness between 1 nanometer and 100 micrometers.

30. The method of claim 1, wherein the substrate comprises a metallic material selected from the group consisting of nickel, molybdenum, titanium, zirconium, tantalum, alloy steel, carbon steel, stainless steel, nickel based super alloys, cobalt based super alloys, copper, aluminum, iron, or mixtures thereof.

31. The method of claim 1, wherein the substrate comprises a bimetal having a first layer comprising a first metallic material and a second layer comprising a second metallic material.

32. The method of claim 31 wherein:
the first metallic material is selected from the group consisting of nickel, molybdenum, titanium, zirconium, tantalum, nickel based super alloys, cobalt based super alloys, copper, or mixtures thereof, and
the second material is selected from the group consisting of aluminum, nickel, alloy steel, carbon steel, stainless steel, nickel based super alloys, or mixtures thereof.

33. The method of claim 32 wherein:
the first metallic material comprises nickel, and
the second material comprises stainless steel.

34. The method of claim 32, wherein the first layer has a thickness between 1 nanometer and 100 micrometers, and the second layer has a thickness between 1 nanometer and 100 micrometers.

35. A method of sinter forging a precursor powder to form a film, the method comprising:
supporting a precursor powder on a substrate; and
simultaneously heating and pressing the precursor powder in a pressing direction parallel to a thickness of the film so as to sinter and densify the precursor powder to form the film in a sinter forging area and wherein, in a plane perpendicular to the pressing direction, there are no lateral constraints on the sinter forging area,
wherein a graphite particle layer is positioned between the substrate and the precursor powder.

36. The method of claim 35 wherein the graphite particle layer has a thickness between 1 μm and 10 μm.

37. The method of claim 1 further comprising:
depositing a flexible material around the film.

38. The method of claim 37 wherein:
the flexible material comprises a polymeric material.

39. The method of claim 37 wherein:
the flexible material comprises a polymeric material selected from the group consisting of polyolefins, polystyrene, divinylbenzene, ethylene vinyl acetate polymers and co-polymers, silicone polymers, and styrene-divinylbenzene copolymer, and blends and mixtures thereof.

40. A method of sinter forging a precursor powder to form a film, the method comprising:
supporting a green yet-unsintered precursor powder on a substrate; and
simultaneously heating and pressing the green yet-unsintered precursor powder in a pressing direction parallel to a thickness of the film so as to sinter and densify the precursor powder to form the film in a sinter forging area and wherein, in a plane perpendicular to the pressing direction, there are no lateral constraints on the sinter forging area,
wherein a thickness dimension of the film is less than a width of the film and a length of the film.

* * * * *

UNITED STATES PATENT AND TRADEMARK OFFICE
CERTIFICATE OF CORRECTION

| | | |
|---|---|---|
| PATENT NO. | : 12,194,661 B2 | Page 1 of 1 |
| APPLICATION NO. | : 17/163726 | |
| DATED | : January 14, 2025 | |
| INVENTOR(S) | : Jeffrey Sakamoto et al. | |

It is certified that error appears in the above-identified patent and that said Letters Patent is hereby corrected as shown below:

In the Specification

Column 14, Line 5, "6978" should be --B978--.

Signed and Sealed this
Eleventh Day of March, 2025

Coke Morgan Stewart
*Acting Director of the United States Patent and Trademark Office*